(12) United States Patent
Wang et al.

(10) Patent No.: US 9,300,934 B2
(45) Date of Patent: Mar. 29, 2016

(54) CHROMA AUTOMATIC GAIN CONTROL

(71) Applicant: Amlogic Co., Ltd., Santa Clara, CA (US)

(72) Inventors: Dongjian Wang, San Jose, CA (US); Wei Zhuang, Shanghai (CN); Xuyun Chen, San Jose, CA (US)

(73) Assignee: Amlogic Co., Ltd., Santa Clara, CA (US)

( * ) Notice: Subject to any disclaimer, the term of this patent is extended or adjusted under 35 U.S.C. 154(b) by 50 days.

(21) Appl. No.: 14/046,890

(22) Filed: Oct. 4, 2013

(65) Prior Publication Data

US 2015/0098023 A1  Apr. 9, 2015

(51) Int. Cl.
*H04N 9/68* (2006.01)

(52) U.S. Cl.
CPC .................... *H04N 9/68* (2013.01)

(58) Field of Classification Search
CPC ........... H04N 9/68; H04N 9/71; H04N 9/455; H04N 9/643; H04N 9/64
USPC ......... 348/645–648, 638, 639, 642, 653, 654, 348/679
See application file for complete search history.

(56) References Cited

U.S. PATENT DOCUMENTS

| | | | | |
|---|---|---|---|---|
| 6,177,962 | B1 * | 1/2001 | Rumreich et al. | 348/648 |
| 7,443,455 | B2 * | 10/2008 | Nave | 348/678 |

* cited by examiner

*Primary Examiner* — Sherrie Hsia
(74) *Attorney, Agent, or Firm* — Venture Pacific Law, PC

(57) ABSTRACT

A method for determining a chroma gain for a modulated chroma signal, comprises the steps: receiving the modulated chroma signal; generating a first chroma gain as a function of a color burst of the received modulated chroma signal; generating a second chroma gain as a function of a peak amplitude of the modulated chroma signal; and determining a final chroma gain for the received modulated chroma signal as a function of the first generated chroma gain and the second generated chroma gain, wherein the determined chroma gain is applied on the modulated chroma signal.

15 Claims, 5 Drawing Sheets

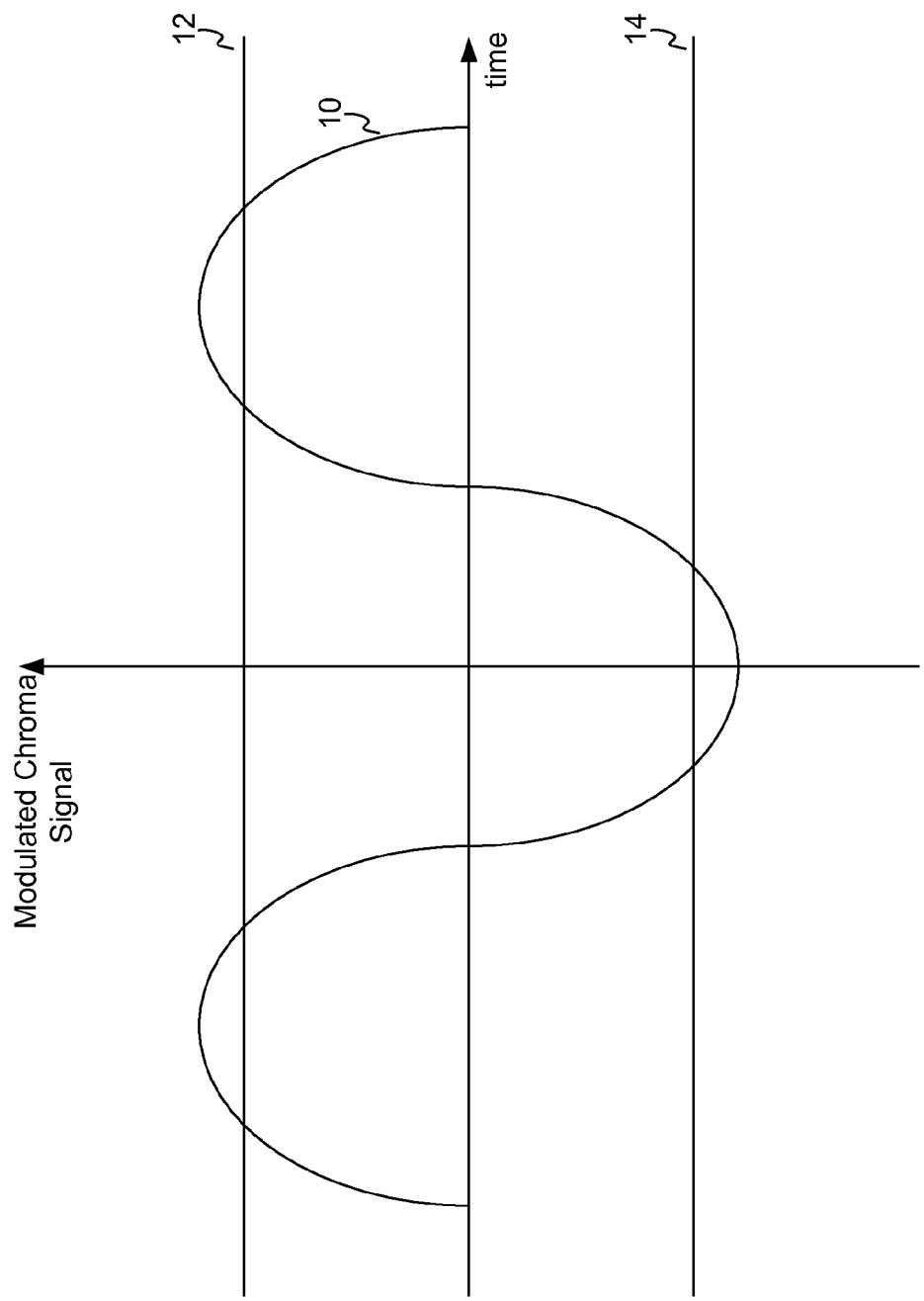

CHROMA AUTOMATIC GAIN CONTROL

FIELD OF INVENTION

This invention generally relates to methods and systems for decoding video data, and, in particular, to methods and systems for chroma automatic gain control.

BACKGROUND

Modern high-performance video and television displays, especially plasma and liquid-crystal (LCD) displays, are adapted to receiving digital signals corresponding to the information to be displayed. These digital inputs indicate the intensity, typically by component, to be displayed by each picture element ("pixel") of the display. For example, modern component video signals include a component value for each of the pixel attributes of luma ("Y"), chroma-blue ("Cb" or "U"), and chroma-red ("Cr" or "V"). As a result, modern high resolution displays are able to render high fidelity images at real time data rates, having over one thousand pixels in each dimension with each pixel responsive to as much as a twenty-four bit digital signal.

As known in the art, video inputs are communicated and stored in a wide variety of formats. Broadcast television signals are still communicated in the analog domain, and these analog signals are communicated according to multiple standards around the world. In addition, video signals from other sources are now also available for display on digital displays. These other sources include cable and satellite digital video transmissions, video cameras, and video playback devices such as DVD players and video cassette recorders. In any case, these signals are often in the form of "composite" video signals, in that the color signals are communicated in the form of "luma" and "chroma" (or color difference) signals, rather than as intensity levels for each of the primary component colors. These signals are also typically analog signals. Examples of the applicable standards for conventional video signals include the well-known NTSC (National Television Systems Committee), PAL, and SECAM composite video signal standards.

Video decoder functions are now commonly used in many high-performance digital display and television systems for receiving video signals from these various sources and converting the video signals into a digital form for display. For example, a so-called "set-top box" for receiving cable or satellite digital video transmissions and for driving a digital video display typically includes a video decoder function. Modern set-top boxes also often have auxiliary inputs for receiving video signals from other sources, from which the video decoder in the set-top box generates the digital video output signals. Other systems that include a video decoder function include video decoder cards for personal computers, personal video recorders (PVRs) for digitally recording broadcast, cable, or satellite transmissions for later viewing, digital video projectors, digital VCRs and DVD recorders, video or home theater receivers, and indeed digital television sets and computer displays that are themselves (i.e., without an external set-top box) capable of digitally displaying video output from conventional analog input signals.

In the decoding of input signals into digitally displayable output signals, conventional video decoders typically apply gain to the decoded signal, so that the digital output signals have amplitudes that fit well within the dynamic range of the display device. Conventional video decoders apply this gain by way of automatic gain control ("AGC"), which in its general sense amplifies a varying input voltage using a gain that depends on the input voltage itself. AGC circuits and functions thus automatically control the amplifier gain so that the output voltage remains constant or within a predetermined dynamic output range.

In conventional video decoders for converting analog video signals into digital display signals, the AGC function measures the amplitude of the analog signal at a known time within the periodic signal, and adjusts the gain of its output signal based on that amplitude. Typically, conventional video decoders sample the analog video signal at its synchronization ("sync") level, which is a portion of the analog signal in the horizontal blanking interval that is not displayable by the display but which is used to synchronize the displayable portions of the signal with the display scan lines. The sync "height", or amplitude (i.e., the difference between the sync level and a reference level, such as the "back porch" level), is used in these conventional video decoders as the control input to an AGC function, in response to which the AGC gain of the video decoder is set.

Generally, the sync amplitude may not be representative of the actual amplitude of the video information to be displayed. For example, in the well-known NTSC standard, the nominal sync amplitude is −40 IRE, but this sync pulse is frequently compressed or clipped. If this clipping occurs, the clipped or compressed sync pulse received by the digital video decoder will be at a lower amplitude than its ideal amplitude. The AGC function in the conventional video decoder will, as a result, set its gain undesirably high in an attempt to compensate for the lower amplitude sync height, but this gain will be too high for the video signal itself (which was not clipped). The resulting images displayed will tend to be saturated, or too bright.

FIG. 1a illustrates a graph of a modulated chroma signal versus time. The overall amplitude of a modulated chroma signal is amplified by a gain based upon a color burst component of the modulated chroma signal. However, due to nonstandard video, the color burst can be very small compared to the other portions of the chroma signal causing oversaturation. Thus, the amplified modulated chroma signal can be clipped between a first boundary 12 and a second boundary 14. Any amplitudes outside this range are clipped to the maximum boundaries 12 and 14. This in turn can cause vertical bands shown in a respective display at places where clipping occurs.

FIG. 1b illustrates a graph of the chroma-blue ("Cb", "Pb", or "U") and chroma-red ("Cr", "PR", or "V") values for video data, where clipping occurs due to the chroma gain of the video data. The displayable Cr and Cb levels are within a window 30. However, an amplified chroma value 34 may be outside this window 30. Thus, the amplified chroma signal will be clipped to the chroma value 32. By doing so, the original hue level 36 is transformed to a hue level 38 that correctly reflect the encoded video, thereby being decoded erroneously. Therefore, there remains a desire to provide new methods for chroma automatic gain control that can minimize clipping of the chroma signal.

SUMMARY OF INVENTION

An object of this invention is to provide methods and systems for chroma gain control during decoding of video data, where clipping of the modulated chroma signal is minimized.

Another object of this invention is to provide methods and systems for chroma gain control to account for chroma amplitude distortion.

Yet another object of this invention is to provide methods and systems for chroma gain control during decoding of video data, where the chroma gain can be updated automatically using samples of the video data.

Briefly, the present invention discloses methods and systems for determining a chroma gain for a modulated chroma signal, comprising the steps: receiving the modulated chroma signal; generating a first chroma gain as a function of a burst amplitude of the received modulated chroma signal; generating a second chroma gain as a function of a peak amplitude of the modulated chroma signal; and determining a final chroma gain for the received modulated chroma signal as a function of the first generated chroma gain and the second generated chroma gain, wherein the determined chroma gain is applied on the modulated chroma signal.

An advantage of this invention is that methods and systems for chroma gain control during decoding of video data are provided, where clipping of the modulated chroma signal is minimized.

Another advantage of this invention is that methods and systems for chroma gain control to account for chroma amplitude distortion are provided.

Yet another advantage of this invention is that methods and systems for chroma gain control during decoding of video data are provided, where the chroma gain can be updated automatically using samples of the video data.

DESCRIPTION OF THE DRAWINGS

The foregoing and other objects, aspects, and advantages of the invention can be better understood from the following detailed description of the preferred embodiment of the invention when taken in conjunction with the accompanying drawings in which:

FIG. 1a illustrates a graph of a modulated chroma signal versus time.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced. To aid in the understanding of the invention, the RGB standard is used in the following examples. However, it is understood that other image and video standards can be used in relation to the present invention.

Figure 1B:
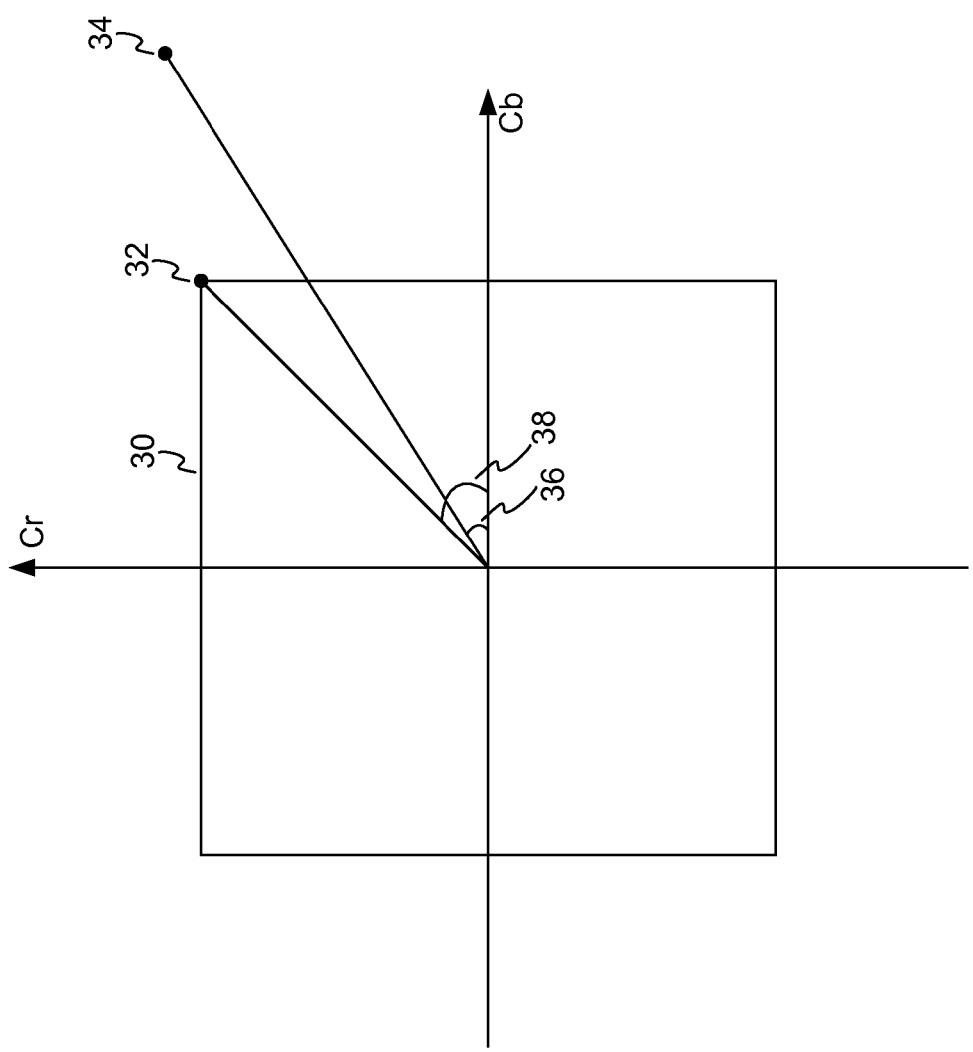
FIG. 1b illustrates a graph of the chroma-blue ("Cb", "Pb", or "U") and chroma-red ("Cr", "PR", or "V") values for video data.
Figure 2:
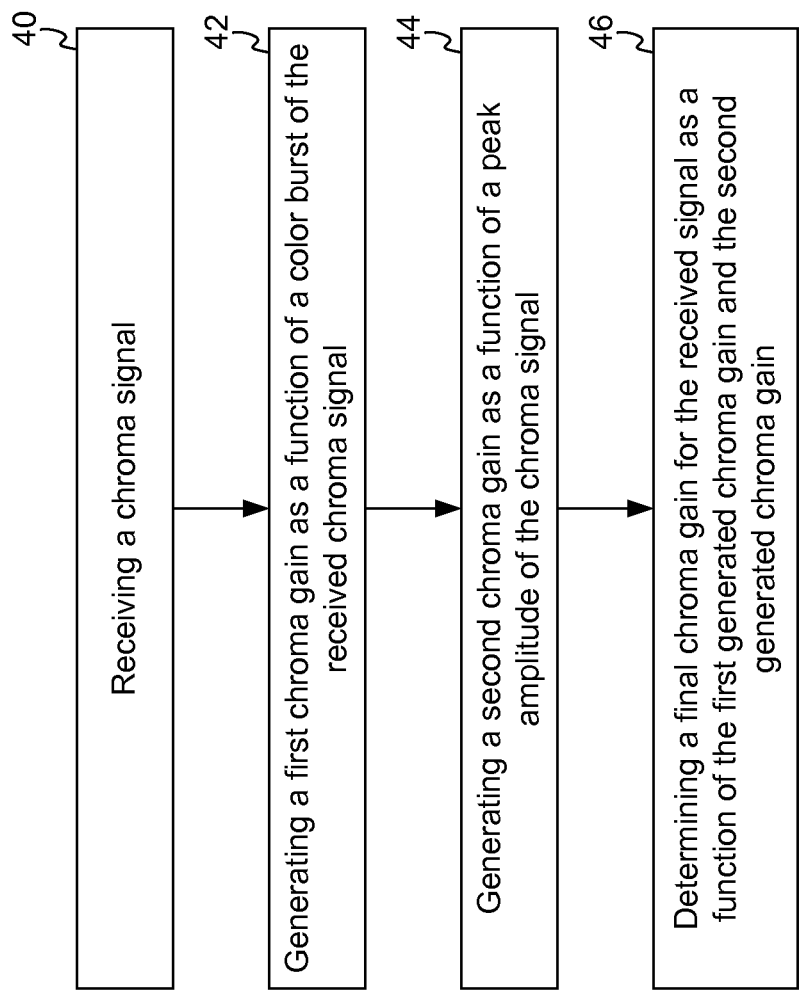
FIG. 2 illustrates a flow chart of the present invention for chroma gain control.

FIG. 2 illustrates a flow chart of the present invention for chroma gain control. A chroma signal is received 40 for demodulation into a chroma-blue and chroma-red components. A first chroma gain can be generated 42 as a function of a color burst component of the chroma signal. In addition, a second chroma gain signal can be generated 44 as a function of a peak amplitude of the chroma signal. Next, a final chroma gain to be applied on the chroma signal is determined 46 as a function of the first generated chroma gain and the second generated chroma gain. Typically, the minimum of the first generated chroma gain and the second generated chroma gain is used as the final chroma gain. Once the final chroma gain is determined, the final chroma gain is applied to the chroma signal to amplify the amplitude of the chroma signal.

Figure 3:
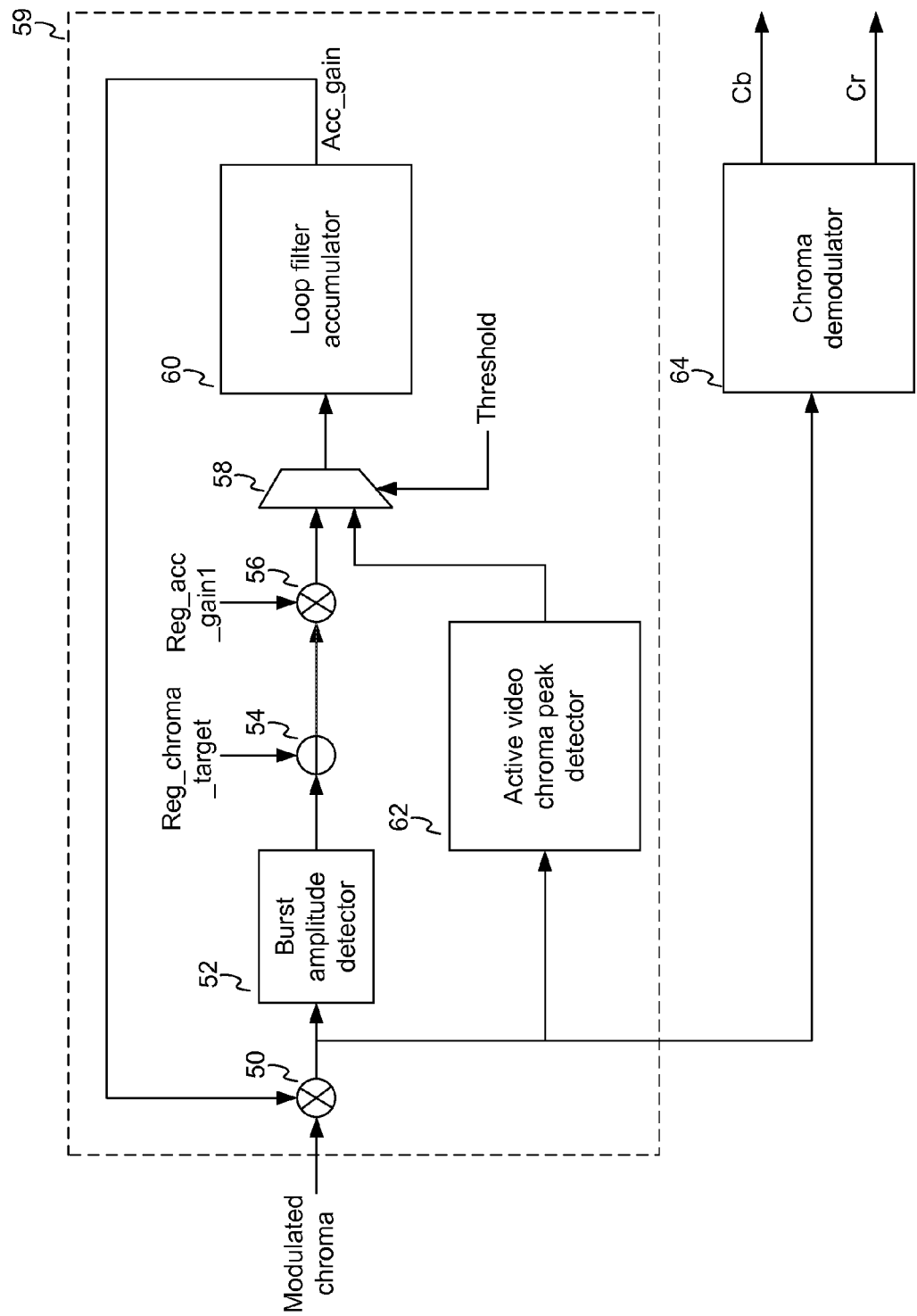
FIG. 3 illustrates a block diagram of the present invention for a chroma gain control connected to a chroma demodulator.

FIG. 3 illustrates a block diagram of the present invention for a chroma gain control connected to a chroma demodulator. A chroma gain control 59 of the present invention can comprise a multiplier 50, a burst amplitude detector 52, a chroma target subtractor 54, a control gain 56, a multiplexer 58, a loop filter accumulator 60, and an active video chroma peak detector 62. A modulated chroma signal is inputted to the multiplier 50. The multiplier 50 applies a final gain ("Acc_gain"). The amplified modulated chroma signal is inputted to the burst amplitude detector 52, the active video chroma peak detector 62, and a chroma demodulator 64. The chroma demodulator 64 demodulates the amplified, modulated chroma signal into a Cb component and a CR component.

The burst amplitude detector 52 determines a color burst component from the chroma signal. During color burst detection, a window is applied to the color burst component and an absolute value function is applied to that color bust component. Next, the absolute value of the color burst can be accumulated to obtain an energy value for the color burst component.

The detected color burst is compared to a chroma target ("Reg_chroma_target") using the subtractor 54. Any difference between the detected color burst and the chroma target is inputted to a multiplier 56 that multiplies that difference with a gain ("Reg_acc_gain1"). The Reg_acc_gain1 can be configured to adjust the speed of the loop filter accumulator 60 to stabilize the amplified, modulated chroma signal to the chroma target. The output of the multiplier 56 can be a first gain, which is inputted to the multiplexer 58.

The active video chroma peak detector 62 detects whether the amplitude of the chroma signal is or will be clipped. The active video chroma peak detector 62 can apply an absolute value function ("abs( )") on the amplified, modulated chroma signal ("C"). The absolute value function of the amplified, modulated chroma signal ("abs(C)") is then compared to a predefined threshold value ("thres1"). The predefined threshold value can be determined based upon a maximum displayable level for a respective device to display the respective video data.

If the abs(C) is greater than the predefined threshold thres1, then the output of the peak detector 62 can equal the following:

$$Pk\_Det(n+1)=Pk\_Det(n)-\Delta 1, \quad \text{Equation [1]}$$

where Pk_Det(1) can equal zero, n is a sample number, and Δ1 can be either a predefined constant, e.g., 10, or a function of the difference between the abs(C) and the predefined threshold thres1. For instance, Δ1 can equal gain*(abs(C)−thres1), where the gain can be a speed of convergence for the chroma gain control.

If the abs(C) is equal to or lower than thres1, then the output of the peak detector 62 can equal the following:

$$Pk\_Det(n+1)=Pk\_Det(n)+\Delta 2, \quad \text{Equation [2]}$$

where Pk_Det(1) can equal zero, n is a sample number, and Δ2 can be either a predefined constant, e.g., 1. The selected output of the peak detector 62 can be referred to as a second gain.

The first gain and the second gain are inputted to the multiplexer 58. The multiplexer 58 takes the minimal value ("X(n)") of the first gain and the second gain, and outputs that minimum value to the loop filter accumulator 60. If the minimal value X(n) is smaller than a negative predefined threshold, then the minimal value is clipped to the negative predefined threshold. If the minimal value X(n) is larger than a positive predefined threshold, the minimal value was clipped to the positive predefined threshold. This clipping can add some protection for the respective system by limiting the range of the input to the accumulator 60. The loop filter accumulator 60 uses that clipped minimum value X(n) to generate the final gain Acc_gain to apply to the modulated chroma signal via the multiplexer 50.

For instance, the loop filter accumulator 60 can use the following function to generate the final gain:

$$f(n)=f(n-1)+X(n), \quad \text{Equation [3]}$$

where n is a sample of the modulated chroma signal and f(0) can be set to 1.0 during the first iteration where n=1. The initial value f(0) can equal another predefined value as well, depending on the speed of convergence and other factors. The output of the loop filter accumulator 60 is the final gain Acc_gain to be applied on the modulated chroma signal, where $$Acc\_gain=f(n)/\text{factor}, \quad \text{Equation [4]}$$

where factor can be a predefined static factor to be applied.

Figure 4:
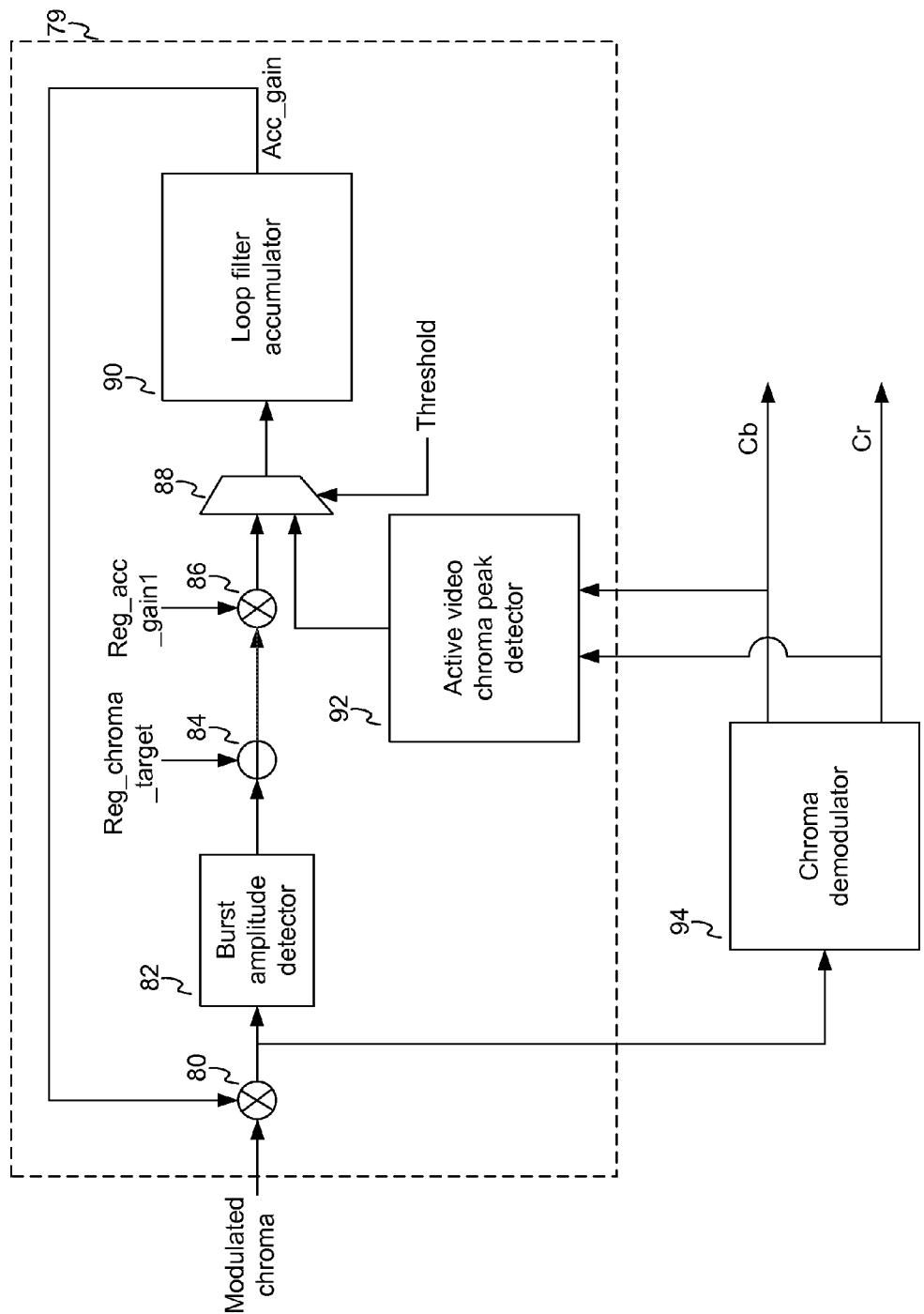
FIG. 4 illustrates a block diagram of another embodiment of the present invention for a chroma gain control connected to a chroma demodulator.

FIG. 4 illustrates a block diagram of another embodiment of the present invention for a chroma gain control connected to a chroma demodulator. A chroma gain control 79 of the present invention can comprise a multiplier 80, a burst amplitude detector 82, a chroma target subtractor 84, a control gain 86, a multiplexer 88, a loop filter accumulator 90, and an active video chroma peak detector 92. A modulated chroma signal is inputted to the multiplier 80. The multiplier 80 applies a final gain Acc_gain. The amplified, modulated chroma signal is inputted to the burst amplitude detector 82 and a chroma demodulator 94. The demodulator 94 demodulated the amplified, demodulated chroma signal into two components, a Cb component and a Cr component. The Cb and Cr components are inputted to the active video chroma peak detector 92.

The burst amplitude detector 82 determines a color burst component from the amplified, modulated chroma signal. During color burst detection, a window is applied to the color burst component, and an absolute value function is further applied to that color bust component. Next, the absolute value of the color burst can be accumulated to obtain an energy value for the color burst component of the amplified modulated chroma signal.

The detected color burst is compared to a chroma target Reg_chroma_target using the subtractor 84. Any difference between the detected color burst and the chroma target are inputted to a multiplier 86 that multiplies that difference with a gain Reg_acc_gain1. The Reg_acc_gain1 can be configured to adjust the speed of the loop filter accumulator 90 to stabilize the amplified, modulated chroma signal to the chroma target. The output of the multiplier 86 can be a first gain, which is inputted to the multiplexer 88.

The active video chroma peak detector 92 detects whether the amplitude of the Cb and Cr chroma color components are or will be clipped. The active video chroma peak detector 92 can apply an absolute value function abs( ) on the Cb and Cr chroma color components.

The absolute value function of the Cb color component abs(Cb) is then compared to a predefined threshold value ("thresCb"). The predefined threshold value thresCb can be determined based upon a maximum displayable level for a respective device to display the respective color component.

If the abs(Cb) is greater than the predefined threshold, then the output of the peak detector 92 can equal the following:

$$Pk\_Det(n+1)=Pk\_Det(n)-\text{gain}*(\text{abs}(Cb)-\text{thres}Cb), \quad \text{Equation [5]}$$

where Pk_Det(1) can equal zero, n is a sample number, and gain can be a speed of convergence for the chroma gain control.

The absolute value function of the Cr color component ("abs(Cr)") can also be compared to a predefined threshold value ("thresCr"). The predefined threshold value thresCr can be determined based upon a maximum displayable level for a respective device to display the respective color component.

If the abs(Cr) is greater than the predefined threshold, then the output of the peak detector 92 can equal the following:

$$Pk\_Det(n+1)=Pk\_Det(n)-\text{gain}*(\text{abs}(Cr)-\text{thres}Cr), \quad \text{Equation [6]}$$

where Pk_Det(1) can equal zero, n is a sample number, and gain can be a speed of convergence for the chroma gain control.

Else, if both the two conditions above are not met, then the output of the peak detector 62 can equal the following:

$$Pk\_Det(n+1)=Pk\_Det(n)+\Delta 2, \quad \text{Equation [7]}$$

where Pk_Det(1) can equal zero, n is a sample number, and $\Delta 2$ can be either a predefined constant, e.g., 1. If both the two conditions above are met, then the smaller value between Equations [5] and [6] is used. The selected output of the peak detector 62 can be referred to as a second gain.

The first gain and the second gain are inputted to the multiplexer 88. If the minimal value X(n) is smaller than a negative predefined threshold, then the minimal value is clipped to the negative predefined threshold. If the minimal value is larger than a positive predefined threshold, then the minimal value is clipped to the positive predefined threshold. This clipping can add some protection to the respective system by limiting the range of the input of the accumulator 90. The multiplexer 88 takes the clipped minimal value X(n) of the first gain and the second gain and outputs that minimum value to the loop filter accumulator 90. The loop filter accumulator 90 uses that minimum value X(n) to generate the final gain Acc_gain to apply to the modulated chroma signal via the multiplexer 50.

For instance, the loop filter accumulator 90 can use the following function to generate the final gain:

$$f(n)=f(n-1)+X(n), \quad \text{Equation [8]}$$

where n is a sample of the modulated chroma signal and f(0) can be set to 1.0 during the first iteration where n=1. The initial value f(0) can equal other predefined values, depending on the speed of convergence. The output of the loop filter accumulator 90 is the final gain Acc_gain to be applied on the modulated chroma signal, where $$Acc\_gain=f(n)/\text{factor}, \quad \text{Equation [9]}$$

where factor can be a predefined static factor to be applied.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for determining a chroma gain for a modulated chroma signal, comprising the steps:
   receiving the modulated chroma signal;
   generating a first chroma gain as a function of a color burst of the received modulated chroma signal;
   generating a second chroma gain as a function of a peak amplitude of the modulated chroma signal; and
   determining a final chroma gain for the received modulated chroma signal as a function of the first generated chroma gain and the second generated chroma gain,
   wherein the determined chroma gain is applied on the modulated chroma signal.

2. The method of claim 1 wherein the minimum value of the first generated chroma gain and the second generated chroma gain is used for determining the final chroma gain.

3. The method of claim 1 wherein in the generating the second chroma gain step, if the peak amplitude is above a predefined threshold, then the second chroma gain is reduced by a predefined constant.

4. The method of claim 1 wherein in the generating the second chroma gain step, if the peak amplitude is below or equal to a predefined threshold, then the second chroma gain is increased by a predefined constant.

5. The method of claim 1 wherein in the generating the second chroma gain step, the modulated chroma signal is demodulated into a color blue ("Cb") signal and a color red ("Cr") signal, and wherein Cb and Cr peak amplitudes are detected for the Cb and the Cr signals.

6. The method of claim 5 wherein if either of the Cb and Cr peak amplitudes is greater than a predefined constant, then the second chroma gain is reduced by a predefined value.

7. The method of claim 5 wherein if the Cb and Cr peak amplitudes is lower than or equal to a predefined constant, then the second chroma gain is increased by a predefined value.

8. A method for determining a chroma gain for a modulated chroma signal, comprising the steps:
   receiving the modulated chroma signal;
   generating a first chroma gain as a function of a color burst of the received modulated chroma signal;
   generating a second chroma gain as a function of a peak amplitude of the modulated chroma signal; and
   determining a final chroma gain for the received modulated chroma signal as a function of the first generated chroma gain and the second generated chroma gain,
   wherein the minimum value of the first generated chroma gain and the second generated chroma gain is used for determining the final chroma gain,
   wherein the determined chroma gain is applied on the modulated chroma signal.

9. The method of claim 8 wherein in the generating the second chroma gain step, if the peak amplitude is above a predefined threshold, then the second chroma gain is reduced by a predefined constant.

10. The method of claim 8 wherein in the generating the second chroma gain step, if the peak amplitude is below or equal to a predefined threshold, then the second chroma gain is increased by a predefined constant.

11. The method of claim 8 wherein in the generating the second chroma gain step, the modulated chroma signal is demodulated into a color blue ("Cb") signal and a color red ("Cr") signal, and wherein Cb and Cr peak amplitudes are detected for the Cb and the Cr signals.

12. The method of claim 11 wherein if either of the Cb and Cr peak amplitudes is greater than a predefined constant, then the second chroma gain is reduced by a predefined value.

13. The method of claim 11 wherein if the Cb and Cr peak amplitudes is lower than or equal to a predefined constant, then the second chroma gain is increased by a predefined value.

14. A method for determining a chroma gain for a modulated chroma signal, comprising the steps:
   receiving the modulated chroma signal;
   generating a first chroma gain as a function of a color burst of the received modulated chroma signal;
   generating a second chroma gain as a function of a peak amplitude of the modulated chroma signal, wherein if the peak amplitude is above a first predefined threshold, then the second chroma gain is reduced by a first predefined constant and wherein if the peak amplitude is below or equal to a second predefined threshold, then the second chroma gain is increased by a second predefined constant; and
   determining a final chroma gain for the received modulated chroma signal as a function of the first generated chroma gain and the second generated chroma gain,
   wherein the minimum value of the first generated chroma gain and the second generated chroma gain is used for determining the final chroma gain,
   wherein the determined chroma gain is applied on the modulated chroma signal.

15. The method of claim 14 wherein in the generating the second chroma gain step, the modulated chroma signal is demodulated into a color blue ("Cb") signal and a color red ("Cr") signal, wherein the Cb and Cr peak amplitudes are detected for the Cb and the Cr signals, wherein if either of the Cb and Cr peak amplitudes is greater than a third predefined constant, then the second chroma gain is reduced by a first predefined value, and wherein if the Cb and Cr peak amplitudes is lower than or equal to a fourth predefined constant, then the second chroma gain is increased by a second predefined value.

* * * * *